US009177304B2

(12) United States Patent
Course et al.

(10) Patent No.: US 9,177,304 B2
(45) Date of Patent: Nov. 3, 2015

(54) ELECTRONIC TRANSACTION SYSTEM (75) Inventors: Philip Course, East Melbourne (AU); Gregory Douglas McCreath, Elwood (AU)

(73) Assignee: TAFMO Australia PTY LTD., Melbourne Victoria (AU)

( * ) Notice: Subject to any disclaimer, the term of this patent is extended or adjusted under 35 U.S.C. 154(b) by 2918 days.

(21) Appl. No.: 10/562,314

(22) PCT Filed: Jun. 28, 2004

(86) PCT No.: PCT/AU2004/000855
§ 371 (c)(1),
(2), (4) Date: May 19, 2006

(87) PCT Pub. No.: WO2005/001725
PCT Pub. Date: Jan. 6, 2005

(65) Prior Publication Data
US 2006/0271499 A1 Nov. 30, 2006

(30) Foreign Application Priority Data

Jun. 27, 2003 (WO) ...................... PCT/AU03/00846

(51) Int. Cl.
*G06Q 20/12* (2012.01)
*G06Q 20/36* (2012.01)
*H04L 29/06* (2006.01)

(52) U.S. Cl.
CPC .......... *G06Q 20/123* (2013.01); *G06Q 20/3674* (2013.01); *H04L 63/10* (2013.01); *H04L 2463/102* (2013.01)

(58) Field of Classification Search
CPC ............................... G06Q 20/02; G06Q 30/00
USPC ................................ 705/65, 39, 14.69, 26.81
See application file for complete search history.

(56) References Cited

U.S. PATENT DOCUMENTS

| 5,809,144 | A | 9/1998 | Sirbu et al. | |
| 6,842,737 | B1 * | 1/2005 | Stiles et al. | 705/6 |
| 2002/0019797 | A1 | 2/2002 | Stewart et al. | |
| 2002/0062249 | A1 * | 5/2002 | Iannacci | 705/14 |
| 2002/0120582 | A1 * | 8/2002 | Elston et al. | 705/64 |
| 2002/0143655 | A1 * | 10/2002 | Elston et al. | 705/26 |

FOREIGN PATENT DOCUMENTS

WO    0068859    11/2000

* cited by examiner

*Primary Examiner* — Calvin L Hewitt, II
*Assistant Examiner* — Nakia Leffall-Allen
(74) *Attorney, Agent, or Firm* — McDermott Will & Emery LLP (57) ABSTRACT

An electronic transaction system comprising a host server, at least one transaction device; at least one service provider system; and a content management system. When a transaction device issues a client request to the host server for one or more of the electronic goods and/or services, the host server operates to generate a client response in reply to the client request. In generating the client response a service request may be issued to the at least one service provider system. Also includes a matrix recording a set of permissions and/or constraints applicable to the electronic transaction system. The content management system references the matrix in determining the content to be provided to each transaction device to ensure that the set of permissions and/or constraints are complied with. Each transaction device further receives a set of unique identifiers from the host server, each identifier representing a component of the content.

36 Claims, 4 Drawing Sheets

ELECTRONIC TRANSACTION SYSTEM

FIELD OF THE INVENTION

The present invention relates to an electronic transaction system. The system is particularly suited for facilitating the sale of services and/or goods in electronic format (such as software).

BACKGROUND ART

The following discussion of the background of the invention is intended to facilitate an understanding of the invention. However, it should be appreciated that the discussion is not an acknowledgement or admission that any of the material referred to was published, known or part of the common general knowledge of the person skilled in the art in any jurisdiction as at the priority date of the application.

Retailing of any good or service often requires the input of multiple parties. This input can be difficult to co-ordinate, particularly in situations where the input of one party, or even the need to contact that party for their input, is dependent on the input of another party. In situations where the retailed service or good is distributed over an electronic network, this problem is further exacerbated by the common expectation that such services or goods can be provided immediately.

Accordingly, it is an object of the present invention to provide an electronic transaction system that is customisable in a manner that simplifies the task of co-ordinating input from multiple parties over an electronic network.

A yet further problem with electronic transaction systems is the need for the electronic transaction system to integrate with the existing, pervasive Electronic Funds Transfer at Point of Sale ("EFTPOS") infrastructure. This poses problems as the EFTPOS infrastructure:

typically comprises transaction devices that include only an embedded payment applications because of their limited memory capacity; and are highly regulated, such that any changes to an application that uses the EFTPOS infrastructure must be recertified—a considerably costly process for the application owner.

One prior method of overcoming this problem has been to integrate the transaction system with the embedded payment application. However, this solution requires the transaction acquirer or processor to modify their main switch to accommodate transaction transactions as well as payment transactions. Such modifications are expensive and time-consuming.

It is therefore an optional, subsidiary, object of the present invention to provide an electronic transaction system that utilises the existing EFTPOS infrastructure while overcoming, or at least partially alleviating, one or more of the aforementioned problems associated with the existing EFTPOS infrastructure.

DISCLOSURE OF THE INVENTION

Throughout the specification, unless the context requires otherwise, the word "comprise" or variations such as "comprises" or "comprising", will be understood to imply the inclusion of a stated integer or group of integers but not the exclusion of any other integer or group of integers.

Further, the term "electronic service" is to be understood as meaning any service where the transaction constituting offer and acceptance of the service is conducted over an electronic medium.

In accordance with a first aspect of the invention there is provided an electronic transaction system comprising:
  a host server;
  at least one transaction device;
  at least one service provider system; and
  a content management system,
where the content management system provides content in the form of details of electronic goods and/or services able to be transacted by the electronic transaction system to the at least one transaction device and where, upon the at least one transaction device issuing a client request to the host server for one or more of the electronic goods and/or services detailed, the host server operates to generate a client response in reply to the client request and in generating the client response, where necessary, issuing a service request to the at least one service provider system and receiving a service response from the at least one service provider.

Ideally, the electronic payment system further comprises a matrix recording a set of permissions and/or constraints applicable to the electronic transaction system, and where the content management system references the matrix in determining the content to be provided to each transaction device of the at least one transaction device to ensure that the set of permissions and/or constraints are complied with. Preferably, the matrix includes at least one of the following dimensions:
  a transaction device dimension;
  an electronic good or service dimension; and
  a merchant dimension,
each dimension operable to recording information in respect of the transaction device, electronic good or service or merchant, as appropriate, that may affect the content to be provided by the content management system The host server may also determine whether the client request complies with the set of permissions and/or constraints recorded in the matrix and references the matrix in generating a client response to ensure that the set of permissions and/or constraints are complied with.

In a further preferred embodiment, each transaction device of the at least one transaction device receives a set of unique identifiers from the host server, each unique identifier representing a component of the content, the transaction device operable to check the set of unique identifiers against content already provided and request content having unique identifiers not already provided from the content management system. The transaction device may further operate to discard components of the content having a unique identifier not included in the set of unique identifiers received from the host server. Ideally, the unique identifier consists of a file name and at least one of the following: a version number; an error check value.

Alternatively, upon creation of content using the content management system, the content management system operates to provide the content to each transaction device of the at least one transaction device. In this manner, almost "real-time" download of content to transaction devices can be attained.

The content preferably includes, in respect of each electronic service and/or good able to be transacted; at least one of the following:
  a description;
  a graphic to represent the electronic service or good;
  details of acceptable payment methods;
  details of acceptable validation or data entry mechanisms; and/or
  details of any document to be provided when the service response confirms a service request was successful.

The content may also include:
a menu structure for navigating the electronic services and goods able to be transacted; and
details of any security mechanisms implemented to control access to any restricted portions of the menu structure;

Each transaction device of the at least one transaction device may receive a scheduled time for transmission of content from the content management system. each transaction device operable to request the set of unique identifiers from the host server on the scheduled time.

Preferably, the host server operates to generate a client response in reply to the client request by reference to a process model, the process model conceptually comprising a series of steps and links, the arrangement of one or more links in respect of a first step representing a second step to process on the first step resolving to a predetermined result in a set of predetermined results. The set of predetermined results, ideally, are a set of Boolean values and a fail result.

The electronic transaction system may also include at least one channel grouping, each channel grouping associated with at least one transaction device, where content provided to each transaction device of a channel grouping is the same as content provided to each other transaction device in the same channel grouping. At least one relationship may also be included in the electronic transaction system, each relationship recording details for facilitating communication between the host server and either a transaction device or a service provider system, using their respective native languages and communication protocols.

In a yet preferred embodiment, the electronic transaction system also includes an electronic inventory, the electronic inventory operable to provide an electronic good to the host server on request. The request from the host server for an electronic good may include a goods identifier, the electronic inventory operable to provide an electronic good having a corresponding goods identifier in response to the request. To combat potential fraud, on return of an electronic good to the electronic inventory, the electronic good is not able to be provided in response to a request from the host server for a predetermined period of time. The electronic good may be a serial number to be provided in redeeming an electronic service able to be transacted.

The electronic transaction system may be operable to issue both synchronous and asynchronous service and client requests. Asynchronous service requests and asynchronous client requests include a correlation key and any response to the asynchronous service request or asynchronous client request, as appropriate, includes the correlation key. As asynchronous service requests can cause confusion for the host server, the host server may be operable to distinguish between a service response and a client request by reference to the correlation key and/or type.

Preferably, each service request, service response, client request and client response is communicated via at least one message bus. The message bus may use a publish/subscribe mechanism of communication.

Ideally, the transaction device includes at least one payment application. Using an intermediate router having a dedicated connection to the host server and to a payments host, the transaction device may forward a service request issued by a transaction device to the host server and forward a payment request issued by the payment application of the transaction device to the payments host.

In a potential alternate processing method, the transaction device issues an authorisation request to the intermediate router for forwarding to the payments host and receives an authorisation reply from the payments host via the intermediate router and where, if so authorised, the transaction device thereafter issues a service request to the host server via the intermediate router and, upon receiving a service response indicating that the service request was successful, issuing a payment request to the payments host via the intermediate router.

The transaction device may further include removable, writeable media for recording one or more of the following: a receipt; an electronic good; details of the client request; details of the client response.

The host server may operate to confirm the identity and/or capacity of the transaction device that issued the client request and, if the identity of the transaction device can not be confirmed, or the capacity of the transaction device is exceeded, ignore the client request.

In accordance with a second aspect of the present invention there is a host server for use in an electronic transaction system according to the first aspect of the invention.

In accordance with a third aspect of the present invention there is a transaction device for use in an electronic transaction system according to the first aspect of the invention.

In accordance with a fourth aspect of the present invention there is a method of performing an electronic transaction comprising the steps of:
providing content in the form of details of electronic goods and/or services able to be transacted to at least one transaction device;
receiving a client request for one or more of the electronic goods and/or services detailed from a transaction device;
generating a client response in reply to the client request which, where necessary, includes issuing a service request to at least one service provider system and receiving a service response from the at least one service provider.

Ideally, the method also includes the step of referencing a matrix recording a set of permissions and/or constraints to ensure that the content to be provided to each transaction device complies with the recorded set of permissions and/or constraints.

Preferably, the method also includes the steps of determining whether the client request complies with the set of permissions and/or constraints recorded in the matrix and the step of generating a client response includes the sub-step of referencing the matrix to ensure that the set of permissions and/or constraints are complied with.

The method may also include the step of sending a set of unique identifiers to each transaction device, each unique identifier representing a component of the content, and the step of transmitting any content having unique identifiers not already provided to the transaction device upon request by the transaction device. Additionally, the method includes the step of receiving a request for the set of unique identifiers from each transaction device at each transaction device's scheduled time.

Preferably, the step of generating a client response includes the substep of executing a process model, the process model conceptually comprising a series of steps and links, the arrangement of one or more links in respect of a first step representing a second step to process on the first step resolving to a predetermined result in a set of predetermined results.

The method also includes the step of associating each transaction device with at leat one channel grouping, the content provided to each transaction device of a channel grouping being the same as content provided to every other transaction device in the same channel grouping.

Ideally, the method includes the step of recording details for facilitating communication between the host server and each transaction device and the host server and each service provider system to form a set of relationships and the step of using the appropriate relationship in the set of relationships to facilitate communication between the host server and transaction device or service provider system, as appropriate, in their respective native languages and communication protocols.

The method may also include the steps of issuing a request to an electronic inventory for an electronic good and receiving an electronic good from the electronic inventory.

Preferably, the method also includes the step of distinguishing between a service response and a client request by reference to a correlation key in the service response and/or type.

The method may also include the step of communicating service requests, service responses, client requests and client responses by way of at least one message bus using a publish/subscribe mechanism of communication.

Preferably, the method includes the steps of confirming the identity and/or capacity of the transaction device that issued the client request and the step of ignoring the client request if the identity of the transaction device can not be confirmed or the capacity of the transaction device is exceeded.

BRIEF DESCRIPTION OF THE DRAWINGS

The invention will now be described with reference to the following drawings, of which.

BEST MODE(S) FOR CARRYING OUT THE INVENTION

Figure 1:
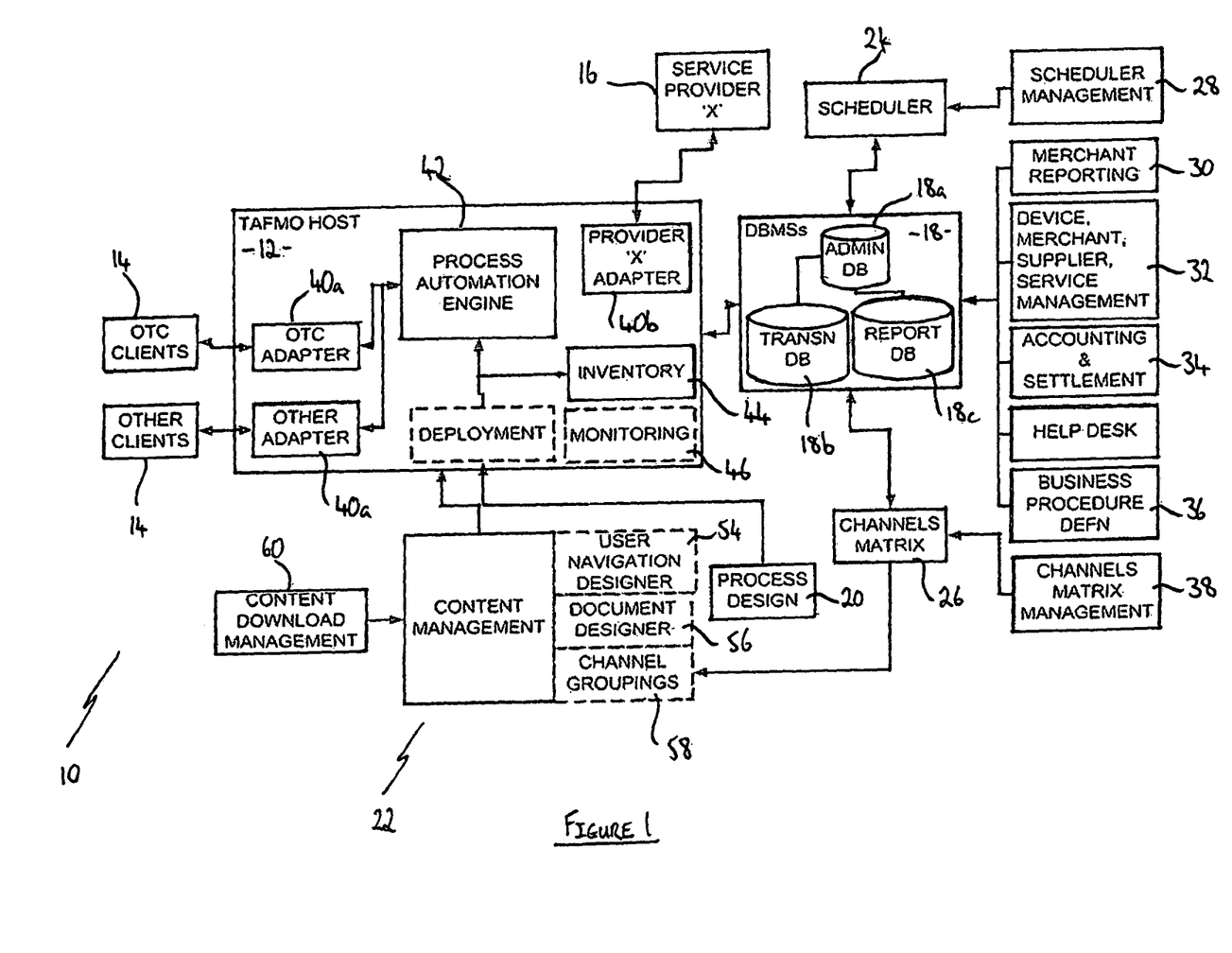
FIG. 1 is a schematic representation of an electronic transaction system.

In accordance with the present invention there is an electronic transaction system 10. In the electronic transaction system 10 being described, and as shown in FIG. 1, the electronic transaction system 10 comprises:
   a host server 12;
   at least one transaction device 14;
   at least one service provider system 16;
   databases 18;
   process designer 20;
   content management system 22;
   scheduler 24;
   channels matrix 26;
   schedule management module 28;
   merchant reporting module 30;
   management module 32;
   accounting and settlement module 34;
   business procedure definition module 36; and
   channels matrix management module 38.

Host Server 12

The host server 12 operates to provide message brokering services between participants involved in an exchange of messages. As such, the host server 12 is in data communication with the at least one transaction device 14, service provider systems 16, databases 18, process designer 20 and content management system 22. The host server 12 further comprises:
   adaptors 40;
   process automation engine ("PAE") 42;
   electronic inventory 44; and
   monitoring system 46.

Adaptors 40

Adaptors 40 can be classified as front-end adaptors 40a and back-end adaptors 40b. Front-end adaptors 40a are responsible for data communication with transaction devices 14. Back-end adaptors 40b are responsible for data communication with service provider systems 16. In other respects, front-end adaptors 40a and back-end adaptors 40b are basically identical.

Each adaptor 40 has an associated relationship. In the context of the functions of an adaptor 40, a relationship represents data necessary for transforming messages received by the adaptor 40 from a format native to the adaptor's 40 associated transaction device 14 or service provider system 16, into a format native to the PAE 42 and vice versa. Thus, by reason of its associated relationship, the adaptor 40 is operable to act as a translator.

Adaptors 40 "listen" for transaction messages from its respective transaction device 14 or service provider system 16, as appropriate. On receipt of a transaction message, the adaptor 40 operates to transform the message in accordance with its associated relationship for forwarding to the PAE 42. Similarly, on receipt of a message from the PAE 42, the adaptor 40 operates to transform the message in accordance with its associated relationship for forwarding to its respective transaction device 14 or service provider system 16, as appropriate.

PAE 42

The PAE 42 is not a single component, but a logical concept comprising:
   at least one process model 48;
   message buses 62;
   a message receiver 64;
   at least one request handler 66;
   a retry receiver 68; and
   at least one process executor 70.

Process Model 48

Process model 48 is, as described in more detail below, a programmatic representation of a business procedure. However, a process model 48 is able to represent any short-duration process that needs to happen repeatedly in a predictable manner.

Message Buses 62

Message buses 62 are used for communicating messages internally between electronic transaction system 10 components. Message buses 62 work on a publish/subscribe arrangement. Messages are published by various components to the desired message bus 62. Such messages may include extra information.

The various components subscribe to the desired message bus 62 in order to receive messages. Subscription requires the component to specify subscription criteria. Thus, on a message being published to the message bus 62, the message bus checks the message against the various subscription criteria of its subscribers. Where the message matches the subscription criteria of a subscriber, the subscriber is notified of the publication of the message to the message bus 62.

In the embodiment being described there are four message buses 62—inbound message bus 62a; outbound message bus 62b; retry message bus 62c; and response message bus 62d.

Message Receiver 64

Message receiver 64 subscribes to inbound message bus 62a. When notified of the existence of a message, the message receiver 64 operates to decode the message. This is done with reference to the relationship associated with the adaptor 40 through which the message has been received. In this manner, while in the context of translation by an adaptor 40, the relationship is agnostic as to the content of the message, in the context of processing of the message for the purposes of the message receiver 64, the relationship may also be interested in the content of the message.

Once decoded, the message receiver 64 operates to determine whether the message is a client request or a service response. In this regard, if the message includes correlation information, the message received 64 designates the message a service response and operates accordingly (refer to the examples below). If the message does not include correlation information, the message receiver 64 assumes that the message is a client request, ie any request for an electronic good or service from a transaction device 14. (Note that in some instances the message receiver 64 may be able to determine that a message is a service response by nature of the format of the message, even in the absence of correlation information). Client requests are then forwarded to request handler 66.

Request Handler 66

Each relationship has an associated request handler 66. On receipt of a client request, the request handler 66 either processes the client request itself, or identifies the appropriate process model that the process executor 70 executes. In the latter arrangement, the request handler 66 forwards the client request to the process executor 70.

Retry Receiver 68

Retry receiver 68 is a subscriber to the retry message bus 62c. The functions of the retry receiver are described in more detail in the examples below.

Process Executor 70

The process executor 70 executes the process model 48 as determined by request handler 66. To some extent, however, the process model 48 is self-executing. The client request provides the initial data upon which the process model 48 operates.

Electronic Inventory 44

The electronic inventory 44 is used to store activated electronic goods. The electronic goods may, amongst others, take the form of movie pass numbers, recharge codes for telecommunications carriers or software.

Electronic goods in the electronic inventory 44 are serialised and are often represented by a 'PIN'. The PIN is a unique number the service provider uses to identify a purchased electronic good. Typically, the PIN is encrypted and is kept private until the time of issue.

PINs cannot be issued twice. An electronic good in the electronic inventory 44 can be used only once. To this end, the electronic inventory 44 must guarantee that a PIN is issued at most once (subject to the following exception).

Electronic goods are typically supplied as a data file containing serialised 'PINs'. The serial numbers are a tracking mechanism for PINs, the PINs are effectively the delivered good. The need to allocate a serial number to each stock item is necessary for supplier relationship purposes. The serial numbers are a public identifier of the electronic good and can be used for reconciliation and problem solving.

If an electronic good is returned, it is put in escrow for a predetermined period of time and may be reconciled with the supplier to determine if it was used or not. Upon completion of the electronic good's escrow period, the unique electronic good is able to be resold.

The need to keep the electronic goods in escrow for a predetermined period of time is for fraud prevention purposes. When a return of a successfully delivered electronic good occurs, the merchant is still in possession of the electronic good and may try to use the electronic good in some way. If the electronic good was then issued to a customer of another merchant, who then proceeded to redeem the electronic good after the initial merchant has used the electronic good, the redemption would be blocked because of the fraud of the initial merchant. However, by placing the electronic good into escrow for a period of time, the chance of this type of fraud occurring is reduced and/or perpetrators of this type of fraud can easily be identified.

Electronic inventory 44 receives service requests from the PAE 42.

Monitoring System 46

Monitoring system 46 operates on a proactive and reactive level. When operating on a proactive level, monitoring system 46 checks key aspects of the operation of the host server 12. If this check reveals that one or more alert conditions are satisfied, an alert is generated. The alert is sent to an appropriate representative of the operator of the electronic transaction system 10 by way of e-mail or SMS message.

When operating on a reactive level, the host server 12 may itself issue a problem notification to the monitoring system 26. The monitoring system 26 then generates an alert. Again, the alert is sent to an appropriate representative of the operator of the electronic transaction system 10 by way of e-mail or SMS message.

Transaction Device 14

Each transaction device 14 comprises a processor and memory means. The processor is operable to execute embedded software stored on the memory means. The embedded software comprises a transaction application and a payment application.

The transaction application is similar to a web browser in nature. It downloads content from the content management system 22 on a periodic basis. This downloaded content may include data relating to.

- a description of the service and/or good to be provided;
- the graphics to be displayed in respect of the service and/or good;
- details of acceptable payment methods for each service and/or good;
- details of acceptable validation or data entry mechanisms for each service and/or good;
- details of any document(s) to be provided to the customer on successful sale of an electronic service or good.
- menu structure for navigating the various services and/or goods available for purchase; and/or
- details of any security mechanisms implemented to control access to any restricted portions of the menu structure.

As such, the downloaded content is used by the transaction application to generate a user interface through which a customer interacts to purchase an electronic service or good. The concept of the user interface is important, as it provides functionality akin to a normal EFTPOS transaction.

The use of downloaded content as the means of developing the user interface means that the transaction application does not change when a new electronic service or good is to be added to the electronic transaction system 10. As a result, there is also no need for the transaction application to be recertified.

As discussed above, the downloaded content may include authentication, data entry and document detail information. As a result, the transaction application must also be capable of controlling a printer, card reader or other peripheral device connected to, or integrated into, the transaction device 14.

The payment application is typically an EFTPOS payment application. However, any payment application capable of processing payment from a customer may be used. The payment application is separate from the transaction application. The payment application and transaction application can communicate though by means of an application programming interface. In this manner, the transaction application does not interfere with the functionality of the payment application.

This is also important as it means that security concerns regarding payment processing are separated from security concerns regarding transaction processing.

Each transaction device 14 is associated with a merchant.

Service Provider Systems 16

Service provider systems 16 represent the computer systems associated with the various suppliers of the electronic services and goods. Each service provider system 16 is in data communication with the host server 12. The processing performed by each service provider system 16 is beyond the scope of the present invention and therefore the service provider systems 16 will not be described in further detail.

Databases 18

Databases 18 comprise an administration database 18a, a transaction database 18b and a reporting database 18c. Administration database 18a stores information relating to the at least one transaction device 14 and the merchant associated with each transaction device 14. Transaction database 18b holds information on each transaction processed by the electronic transaction system 10. Reporting database 18c holds the same information as held in administration database 18a and transaction database 18b, but in a simplified form, particularly optimised for reporting. In this manner, the transaction database 18b is also relieved of some processing load.

As information is constantly being written to the databases 18, and the timing and type of information to be written to the databases 18 would be known to the person skilled in the art, specific instances will not be described herein.

Process Designer 20

Process designer 20 is used to create the process model 48. While the process model 48 is computer software, conceptually, a process model 48 consists of a series of steps 50 and links 52.

Figure 2:
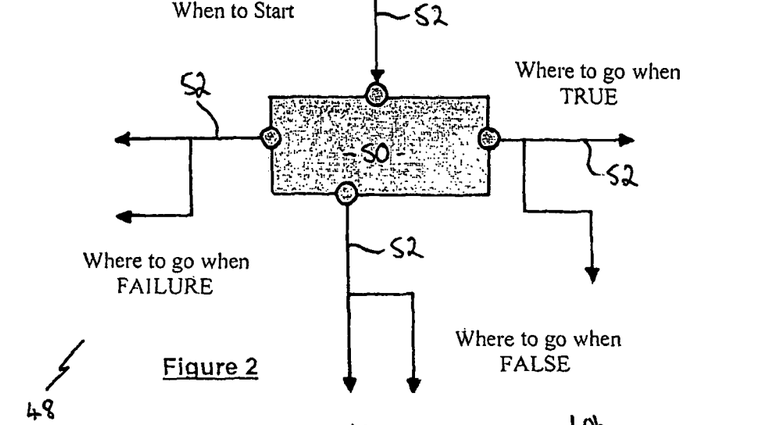
FIG. 2 is a conceptual representation of a process model step, with link attachments, as used in the electronic transaction system of FIG. 1.
Figure 3:
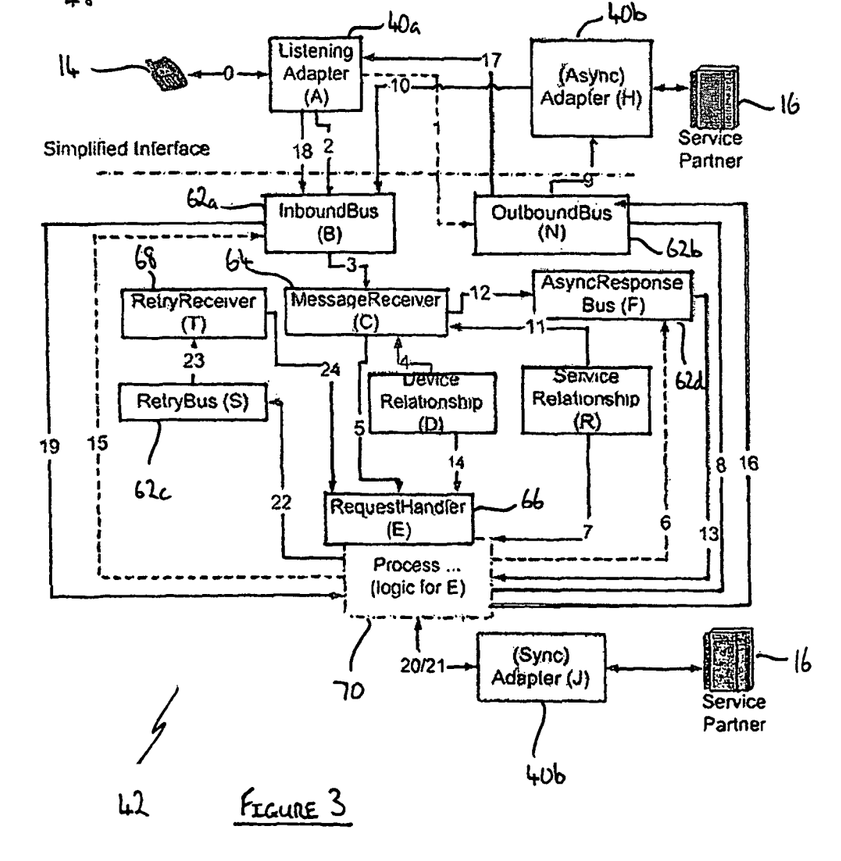
FIG. 3 is an illustration of process flows of a host server as illustrated in FIG. 1.

As shown in FIG. 2, the position of each link 52 provides direction as to the next step 50 to execute based on the outcome of the present step 50. To elaborate, links 52 that connect to the top of the step 50 represent the connection from a parent step 50 (ie. the step 50 that has just finished processing). Links 52 that sprout from the left of step 50 represent the connection to a child step 50 that is to execute on failure of the current step 50. Links 52 that sprout from the bottom of step 50 represent the connection to a child step 50 that is to execute on the current step 50 resolving to a value of "FALSE". Links 52 that sprout from the right of step 50 represent the connection to a child step 50 that is to execute on the current step 50 resolving to a value of "TRUE". Thus, each step 50 must resolve to a Boolean value or fail.

Multiple links 52 may sprout from the left, right or bottom of a step 50 as a means of indicating parallel child steps 50 to be processed on resolution of step 50.

This uniform structure for process models simplifies processing for delivery of the electronic good or service.

Content Management System 22

In essence the content management system 22 controls the construction, release and maintenance of content downloaded by transaction devices 14. However, in doing so, the content management system 22 references the channels matrix 26 to ensure that any constraints recorded in the channels matrix 26 are not contravened. In doing so, this may result in exclusion of part, or all, of the content.

The content management system 22 comprises a user navigation designer 54, a document designer 56, a channel groupings module 58 and a content download management module 60.

The user navigation designer 54 allows for creation of a menu system ultimately replicated on the transaction device 14 following content download. It also allows a party to designate in what manner the customer is required to interact with the transaction device 14 in order to purchase the specified goods and/or services. For example, using the user navigation designer 54 anyone may specify what information, if any, is to be obtained by means of magnetic swipe card or an external keyboard, for example, information in respect of the customer's account number.

The document designer 56 facilitates the graphical design of documents to be printed by the transaction device 14. The designed documents form part of the content. Ideally, document designer 56 is used to produce receipts to be issued to customers upon completion of a successful transaction.

Channel grouping module 58 facilitates allocation of a transaction device 14 to a channel grouping. A channel grouping represents a collection of transaction devices 14 that are to receive the same content.

Each transaction device 14 can belong to one or more channel groupings. A transaction device 14 can have its channel grouping changed or have a channel grouping added at any time.

Content download management module 60 facilitates the scheduling of downloads for particular transaction devices 14 or channel groupings. In this context, the content download management module 60 notifies each transaction device 14 of its scheduled time to download content. The transaction device 60 then contacts the host server 12 at the scheduled time to initiate the content download.

The content download management module 60 also manages the reporting of the success or failure of a scheduled download, as appropriate.

Scheduler 24 and Schedule Management Module 28

Scheduler 24 and schedule management module 28 combined operate to manage any scheduled task, other than content download. One scheduled task handled by the scheduler 24 and schedule management module 28 is the periodic transmission of a transaction listing to service provider systems 16.

Channels Matrix 26 and Channels Matrix Management Module 38

The channels matrix 26 is central to controlling whether a merchant can sell a product, and if so, for what price, and at what commission. The channels matrix 26 is also used during transaction processing to ensure that the rules implemented therein are always satisfied. To elaborate, if the content of a transaction device 14 is somehow out-of-date, the channels matrix 26 may disallow a sale of a product if it is being sold for an incorrect price.

Channels matrix management module 38 manages the channels matrix 26. Channels matrix 26 is a multi-dimensional matrix used to control the electronic services and/or goods available for sale by each transaction device 14, channel grouping or merchant. Factors covered by the channels matrix 26 include:

availability;

pricing; and merchant margin (ie. commission).

In this manner, the availability and price of an electronic service or good may be adjusted based on such factors as the locality of, or industry segment of the merchant associated with, the transaction device 14. The channels matrix 26 further allows for business rules, such as "merchants in industry X, belonging to bank Y, cannot sell electronic service Z after date D", to be implemented—each business rule having a predetermined lifespan.

The dimensions of the channels matrix 26 are composed of attributes of the device, the merchant and the electronic good or service. An example of a device attribute is 'Location'; an example of a merchant attribute is 'Retailer Group'; and an example of an electronic good or service is 'Brand'. Implemented business rules are made by combining attributes of merchants and devices and electronic goods or services.

Business rules are cumulative. If more than a single rule applies to a device for merchant margin or price than an algorithm is used to establish the most 'relevant' rule. This algorithm is based on a weighting value scheme between attributes.

Merchant Reporting Module 30

The merchant reporting module 30 allows merchants and other operators of transaction devices 14 to access a series of secure reporting screens. Each reporting screen lists details of transactions as recorded within reporting database 18c or details of transactions presently being processed by the PAE 42. The transaction details may be provided as drill down graphs or summaries as desired by the merchant or operator, as appropriate.

Management Module 32

Management module 32 allows for a transaction device 14 or service provider system 16 to be declared inactive. When a transaction device 14 is declared inactive, the host server 12 is not able to receive transactions from the transaction device 14. When a service provider system 16 is declared inactive, the host server 12 is not able to process any transactions requesting purchase of an electronic service or good provided by the merchant associated with the service provider system 16.

The management module 32 also manages information in respect of each transaction device 14, merchant, supplier, channel, industry segment and other global information made use of by the electronic transaction system 10.

Accounting and Settlement Module 34

Accounting and settlement module 34 performs procedures that provide for settlement between a merchant and the operator of the electronic transaction system 10. This is required because the operator of the electronic transaction system 10 is not an acquirer of the financial transaction (transactions processed by the transaction device 14 accruing to the merchant who made the sale).

Business Procedure Definition Module 36

The business procedure definition module 36 facilitates the definition of repeatable business processes, such as 'release a new product' or 'change the merchant margin for channel X'. Often there are many repeatable business processes surrounding the brokering of electronic goods or services. A repeatable business procedure helps to maintain quality and consistency within the electronic transaction system 10.

Business procedures are stored in the administration database 18a.

The invention will now be described in the context of two examples of its expected use, with additional components being described as necessary. As the two examples have a common setup procedure, this setup procedure is described first.

Using process designer 20, an administrator of the electronic transaction system 10 creates at least one process model 48. Each process model 48 is representative of the processing subsequently to occur by the PAE 42 on receipt of an appropriate client request.

The administrator also checks the level of stock in the electronic inventory 44. If the level of stock is low, a request for more stock is made to the appropriate supplier.

The supplier then provides the stock in the form of an encrypted file of predetermined format. Ideally, the stock recorded in the encrypted file is delivered in an "inactive" state. In this manner, the stock cannot be used by another party who may receive the encrypted file by mistake. Upon successful decryption of the file, the administrator confirms receipt of the file with the supplier. In turn, the supplier operates to activate the stock recorded in the encrypted file.

At roughly the same time, the administrator or a merchant generates content relating to the proposed delivery of an electronic good or service using the content management system 22. The content management system 22 only allows content to be generated that conforms with the constraints recorded in the channels matrix 26. The administrator or merchant may also act to allocate, or amend allocations of, transaction devices 14 to channel groupings as may be necessary for appropriate delivery of the electronic good or service.

Once the administrator or merchant has completed generating the desired content, the content download management module 60 communicates with the transaction device 14 via the intermediate router. The communication informs the transaction device of the scheduled time that it should contact host server 12 to download content—in this situation, the new content generated by the administrator or merchant, as appropriate.

The payment device 14, at the scheduled time, then operates to contact host server 12, through an intermediate router (discussed in more detail below). In response, host server 12 sends to the payment device 14—again, via the intermediate router—a set of file names with associated cyclical redundancy check (CRC) numbers.

Each file name and CRC number represents a component of the content to be downloaded to memory. However, as the transaction device 14 is a low-bandwidth device, a comparison is first made between each filename and CRC number in the set of file names and CRC numbers and the file names and CRC numbers associated with components of content already downloaded. Only in instances where a file name and CRC number in the set of file name and CRC numbers does not match a file name and CRC number associated with components of content already downloaded does the transaction device 14 operate to download to memory the components of content having the non-matching file name and CRC numbers from content management system 22.

Those components of content already downloaded that have an associated file name and CRC number that does not match a file name and CRC number in the set of file names and CRC numbers are deleted from memory. In this manner, the file name and CRC numbers of components of the content stored in memory always exactly match the file names and CRC numbers in the set of file names and CRC numbers received from host server 12.

The content stored in memory is then used by the transaction application to generate a user interface through which a customer interacts to purchase an electronic service or good.

Once a customer's selection of a transaction has been completed using the user interface, the transaction device 14 operates a modem that forms part of the transaction device 14. The modem, via a telecommunications network to which it is connected, forms a connection with the intermediate router.

Intermediate router has dedicated connections to both a payments host and host server 12. In this manner, both service- and payment-related transactions can occur within the scope of a single call. The intermediate router firstly attends to the payment-related transaction by forwarding the transaction to the payments host. On successfully transacting payment, the payments host sends an authorisation response back to the intermediate router. The intermediate router forwards the authorisation response to the transaction device 14.

The intermediate router then forwards the service related transaction to host server 12 who treats the transaction as a client request. Host server 12 receives the client request at adaptor 40a.

The adaptor 40a then publishes the request to inbound message bus 62a along with message context information. The message context information indicates any errors that occurred during delivery as well as any other information the adaptor 40a may include. The message context information will often include an identifier the adaptor 40a can use as a correlation key. This is the first correlation key.

The adaptor 40a then awaits a response from the PAE 42 regarding the request. To receive such a response, adaptor 40a subscribes to outbound message bus 62b for messages published by the PAE 42 including the first correlation key.

Message receiver 64 also has a subscription to inbound message bus 62a. Its subscription is for all new client requests. Thus, on publication of the request, inbound message bus 62a notifies message receiver 64 of the existence of the request. The message receiver 64 then retrieves the request from the inbound message bus 62a.

As the message retrieved from the inbound message bus 62a is unknown to the message receiver 64, message receiver 64 initially treats the message as a client request. However, the message receiver 64 thereafter decodes the message using the relationship associated with adaptor 40a. Once decoded, and as mentioned above, the message receiver 64 operates to determine the type of message by reference to:

the inclusion or omission of a correlation key; and/or the format of the message.

In this example, as message receiver 64 resolves the message to be a client request, the message is passed to request handler 66.

Request handler 66 processes the message to determine the appropriate process model 48 to use to execute the client request. Once the appropriate process model 48 has been determined, control is passed to process executor 70 to execute the process model 48. Typically, for electronic services a 'service master process model' will be used. Within this services master process model, specific processing will be performed for a particular electronic service by identifying the requested 'service ID' in the client request message. Each service ID will have a process model 48 associated with it and the service master process model will execute this service specific process model 48 as a sub-process.

It is at this point that the examples differ.

In this, the first example, process model 48 includes an asynchronous service request and then a synchronous service request. Processing executes as normal until the asynchronous service request is reached.

In executing the process model 48, process executor 70 subscribes to response message bus 62d in order to properly process the asynchronous service request. The subscription is based on a second correlation key.

As the asynchronous service request is to be issued to service provider system 16, it is necessary for the process executor 70 to encode the asynchronous service request. Encoding is made in accordance with the relationship associated with adaptor 40b, itself associated with service provider system 16. The encoded asynchronous service request is then published to outbound message bus 62b. The encoded asynchronous service request includes the second correlation key.

Processing of the process model 48, then proceeds as per normal.

Adaptor 40b is also a subscriber to outbound message bus 62b. Adaptor 40b subscribes on the basis of the services that it offers (which necessarily need to be incorporated into encoded asynchronous service request message). Accordingly, on publication of the encoded asynchronous service request message, outbound message bus 62b notifies adaptor 40b of the publication of the encoded asynchronous request message. Adaptor 40b then retrieves the encoded asynchronous request message from the outbound message bus 62b.

The encoded asynchronous service request message is then sent to service provider system 16.

The service provider system 16 then processes the asynchronous service request message to generate a service response. Service response is then sent by the service provider system 16 to adaptor 40b. Service response includes the second correlation key.

The adaptor 40b then publishes the service response to inbound message bus 62a along with message context information. The message context information indicates any errors that occurred during delivery and/or transformation. The published form of the service response includes the second correlation key.

On publication of the service response, inbound message bus 62a notifies message receiver 64 of the existence of the service response. The message receiver 64 then retrieves the service response from the inbound message bus 62a and decodes the message using the relationship associated with adaptor 40b.

On analysis of the decoded service response, the message receiver 64 confirms the message to be a service response by virtue of the existence of the second correlation key. The decoded service response is then published to response message bus 62d with its second correlation key.

Process executor 70 is then informed of the publication of the decoded service response by response message bus 62d and retrieves the decoded service response from the response message bus 62d. The decoded service response is then used in further processing of the process model 48 as may be required.

Processing of the process model 48 then proceeds until it reaches the synchronous service request.

Again, as the synchronous service request is to be issued to service provider system 16, it is necessary for the process executor 70 to encode the synchronous service request. Encoding is made in accordance with the relationship associated with adaptor 40*b*, itself associated with service provider system 16. The encoded synchronous service request is then published to outbound message bus 62*b* along with message context information.

At this stage, further processing of the process model 48 by the PAE 42 is then halted pending return of a service response by service provider system 16.

On publication of the encoded synchronous service request message, outbound message bus 62*b* notifies adaptor 40*b* of the publication of the encoded synchronous request message. Adaptor 40*b* then retrieves the encoded synchronous request message from the outbound message bus 62*b* and its message context information.

The encoded synchronous service request message is then sent to service provider system 16.

The service provider system 16 then processes the synchronous service request message to generate a service response. Service response is then sent by the service provider system 16 to adaptor 40*b*.

The adaptor 40*b* then publishes the service response to inbound message bus 62*a* along with message context information. The message context information indicates any errors that occurred during delivery as well as any other information the adaptor 40*b* may include.

On publication of the service response, inbound message bus 62*a* notifies message receiver 64 of the existence of the service response. The message receiver 64 then retrieves the service response from the inbound message bus 62*a* and decodes the message using the relationship associated with adaptor 40*b*.

The decoded service response message is then treated by the message receiver 64 as a response to its service request and publishes the decoded service response to response message bus 62*d*. This correlation is made possible by the blocking of further processing of the process model 48 as described above.

Process executor 70 is then informed of the publication of decoded service response by response message bus 62*d* and retrieves the decoded service response from the response message bus. The decoded service response is then used in further processing of the process model 48.

If, for any reason, it is not possible to process a client request, the client request may be published to retry message bus 62*c*. Retry receiver 68 is a subscriber to the retry message bus 62*c*. Operation of the retry receiver 68 is similar to message receiver 66. However, retry receiver's 68 subscription to retry message bus 62*c* allows for client requests to remain published on the retry message bus 62*c* for a set period of time before being retrieved.

In this, the second example, process model 48 operates to issue an electronic good from electronic inventory 44.

When process model 48 reaches a request for an electronic good to be issued from electronic inventory 44, it issues a service request to the electronic inventory 44. In this manner, for the purposes of dealing with service requests, the electronic inventory 44 is treated the same as a service provider system 16 even though it is an internal component of the host server 12.

Electronic inventory 44 receives a service request from the PAE 42 (as initiated by process model 48). On receipt of the service request, the electronic inventory 44 checks the service request for a service ID. The electronic inventory 44 then checks for an electronic good having the same service ID. Upon identifying a corresponding electronic good having the same service ID, the electronic inventory 44 operates to issue the electronic good to transaction device 14.

At this point, processing of both the first and second examples conform. Accordingly, the description hereafter relates to both examples.

Following execution of a process model 48, a client response message is generated indicating the success or failure of the client request, as appropriate. Accordingly, process executor 70 subscribes to inbound message bus 62*a* in order to ensure that the service response is actually received by the transaction device 14 that issued the service request. The subscription is based on a third correlation key.

The processor executor 70 thereafter encodes the client response message in accordance with the relationship associated with adaptor 40*a*. The encoded client response is then published to outbound message bus 62*b* along with all message context information that was received in the client request message. Thus, the encoded client response includes the first correlation key as well as a new third correlation key.

Adaptor 40*a* is also a subscriber to outbound message bus 62*b*. Adaptor 40*a* subscribes on the basis of the first correlation key. Accordingly, on publication of the encoded client response message, outbound message bus 62*b* notifies adaptor 40*a* of the publication of the encoded client response message. Adaptor 40*a* then retrieves the encoded client response message from the outbound message bus 62*b*. Adaptor 40*a* then operates to determine the client request that the encoded client response corresponds with by means of the first correlation key. Thereafter, the encoded client response is sent as a message to the intermediate router.

The intermediate router then forwards the client response message to the transaction device 14. If the client response message indicates that the client request was unsuccessful, the transaction device 14 sends a payment reversal request to the payment host via the intermediate router.

In either case, the adaptor 40*a* operates to send a delivery confirmation message to the PAE 42. The delivery confirmation message includes the third correlation key. The delivery confirmation message confirms with the PAE 42 that the response has been delivered to the appropriate transaction device 14.

The adaptor 40*a* then publishes the delivery confirmation message to inbound message bus 62*a*.

On publication of the delivery confirmation message, inbound message bus 62*a* notifies process executor 70. Process executor 70 then retrieves the delivery confirmation message from the inbound message bus 62*a*.

If no delivery confirmation message is received within a predetermined time period, process executor 70 treats the delivery as a failure. On failure of a delivery, roll-back commands are processed to reverse the processing performed by the PAE 42 in executing the process model 48 to which the failed delivery relates. This may include sending roll-back commands to service provider systems 16.

Figure 4:
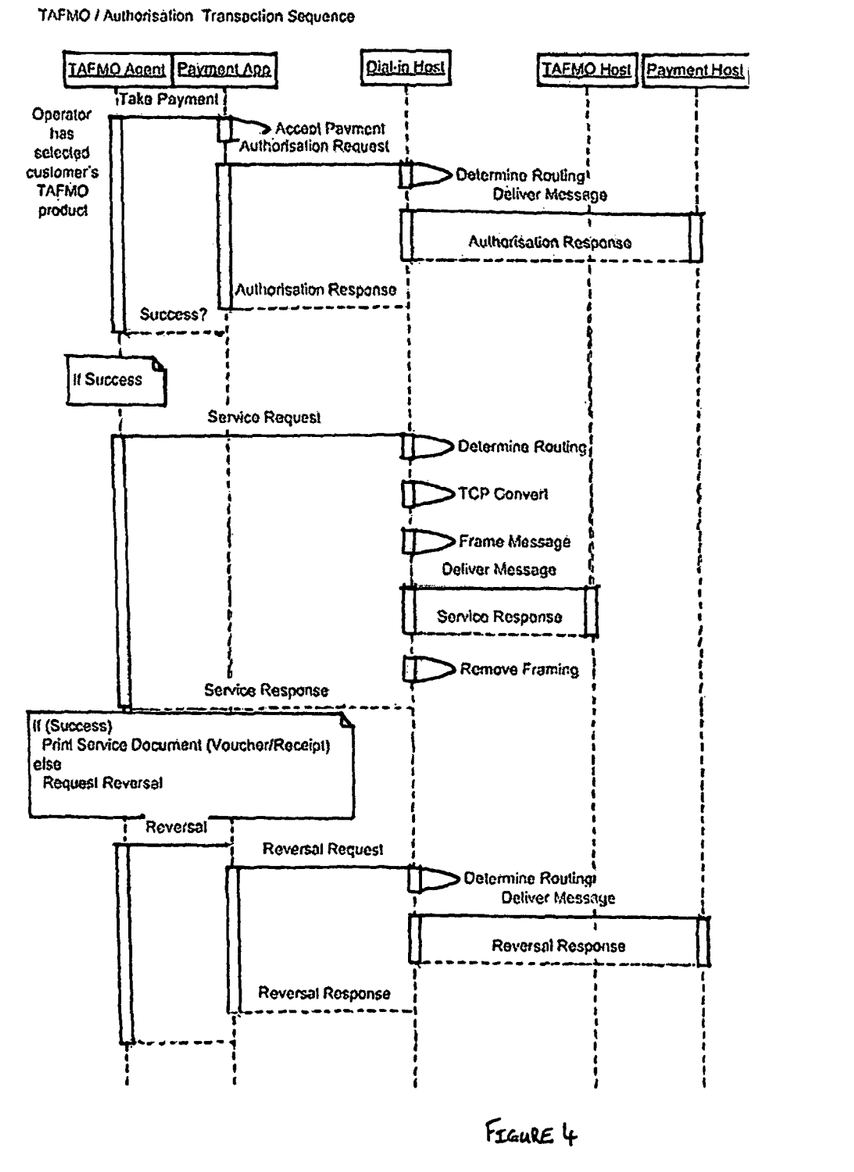
FIG. 4 is a diagram of a transaction sequence used by a transaction device when communication with the host server as illustrated in FIG. 1.

From the point of view of a transaction device 14, this is shown graphically at FIG. 4.

It should be appreciated by the person skilled in the art that the invention is not limited to the examples described. In particular, the following additions and/or modifications can be made without departing from the scope of the invention:

the user interface generated by the transaction application may operate to receive input by means of an integrated keypad of the transaction device 14. Alternatively, input may be provided by means of a touchscreen through which the user interface is also displayed.

Authorisation procedures can be implemented where multiple, unrelated merchants or operators use the same electronic transaction system 10. In such an arrangement, transaction details may be filtered such that details only relevant to the merchant or operator are shown.

Front-end adaptors 40*a* may be modified to provide means for confirming the identity of a transaction device 14 from which it receives a transaction message. If the identity of a transaction device 14 can not be confirmed, the transaction message will be left to timeout on the assumption that the transaction message represents an attempted breach of security. Additionally, checks may be made against the capacity of a transaction device 14. In this manner, the host server 12 can seek to ignore transaction devices 14 that may be externally controlled as part of a denial of service attack.

Adaptors 40 may be in permanent communication with its associated transaction device 14 or associated service provider system 16, as appropriate. If communicating via TCP/IP this may be by means of a single socket.

The transaction device 14 may be adapted to include removable, writeable media, such as a memory stick, floppy disk, compact disc or digital video disc. In this manner, the transaction device 14 can record an electronic good, or document, on the writeable media which the customer can then take away with them.

Transaction device 14, via intermediate router, may operate to obtain a pre-authorisation indication from the payments host rather than actually transacting a payment. Accordingly, if the service response indicates that the service request was unsuccessful, a reversal payment request need not be made. However, if the service response indicates that the service request was successful, confirmation of payment can then be made by the payments host in response to a request issued by the transaction device 14, via the intermediate router.

Figure 5:
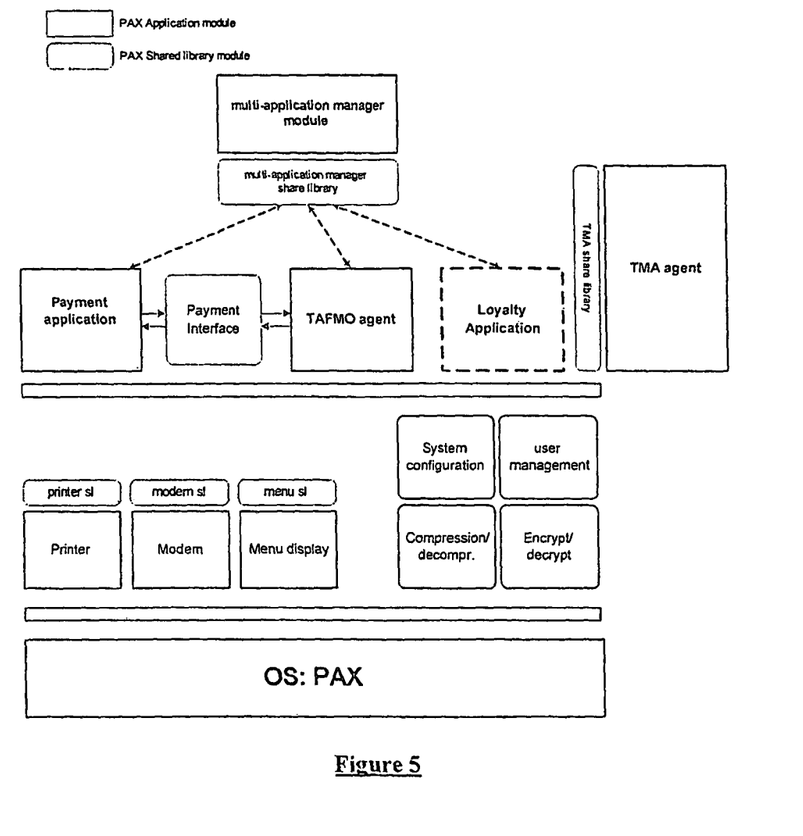
FIG. 5 is a schematic of the components of a multi-purpose transaction device for use in the electronic Transaction system of FIG. 1.

In a further arrangement, transaction device 14 may omit the payment application. In such an arrangement, intermediate host may also be omitted, a modem or other communications device integrated into the transaction device 14 operable to establish a direct connection with host server 12. Alternatively, transaction device 14 may incorporate one or more applications in addition to the payment and transaction applications. In this arrangement, as illustrated in FIG. 5, such applications may be managed by a multi-application manager module so as to properly control access to resources, such as the modem and screen, by each application. Thus, payment can be made by way of a standard payment application, or a non-standard payment application, such as a loyalty point payment application.

All transmissions to and from host server 12 may be encrypted. Ideally, any encryption technique used meets the encryption standards set for financial institutions.

While the transaction device 14 has been described as including a modem for communication with the intermediate router/host server 12, it should be appreciated by the person skilled in the art that any communication means may be used. Yet further, the transaction device 14 may be in direct connection with the intermediate router/host server 12, as appropriate, in which case the communication means takes the form of communications software stored in the memory of the transaction device 14.

Process model 48 may be arranged such that steps 50 may resolve to a fail value and values other than Boolean values.

Message buses 62 may implement messaging mechanisms other than the publish/subscribe mechanism referred to herein. For example, direct communication or "blackboard"-like messaging arrangements may be used.

Electronic inventory 44 may be adapted to dispense electronic goods of a single type. In such an arrangement, serial IDs may be omitted.

The transaction device 14 need not be a dedicated device with embedded software. The transaction device 14 may actually be a personal computer or an integrated cash register.

Content need not be scheduled for download at specified times but may be downloaded on creation. In this manner, content can be provided to the transaction devices 14 on an almost "real-time" basis following its creation via the content management system 22.

The claims defining the invention are as follows:

1. An electronic transaction system comprising:

a host server storing an electronic inventory of electronic goods and/or services;

at least one transaction device having a transaction application;

at least one service provider system; and a content management system that provides content in the form of details of the electronic goods and/or services stored in the electronic inventory where the transaction device is operable to generate a user interface using the details and generate a client request for one or more of the electronic goods and/or services using the transaction application the host server is operable to:

receive a client request from the transaction device, generate a client response to the client request, issue a service request to the at least one service provider system, receive a service response from the at least one service provider and issue the requested electronic goods and/or services to the at least one transaction device based on the service response where each transaction device is further operable to:

receive a scheduled time for transmission of content from the content management system;

request a set of unique identifiers from the host server on the scheduled time of transmission;

receive the set of unique identifiers from the host server each unique identifier representing a component of the content, check the set of unique identifiers against content already provided by the content management system and request content having unique identifiers not already provided from the content management system;

wherein the content management system further receives the request for content having unique identifiers not already provided from the content management system and provides content in response to the request.

2. An electronic transaction system according to claim 1, further comprising a matrix recording a set of permissions and/or constraints applicable to the electronic transaction system, and where the content management system references the matrix in determining the content to be provided to each transaction device of the at least one transaction device to ensure that the set of permissions and/or constraints are complied with.

3. An electronic transaction system according to claim 2, where the matrix includes at least one of the following dimensions:
   a transaction device dimension;
   an electronic good or service dimension; and
   a merchant dimension,
   each dimension operable to record information in respect of the transaction device,
   electronic good or service or merchant, as appropriate, that may affect the content to be provided by the content management system.

4. An electronic transaction system according to claim 2, where the host server determines whether the client request complies with the set of permissions and/or constraints recorded in the matrix and references the matrix in generating a client response to ensure that the set of permissions and/or constraints are complied with.

5. An electronic transaction system according to claim 1, where the transaction device is further operable to discard components of the content having a unique identifier not included in the set of unique identifiers received from the host server.

6. An electronic transaction system according to claim 1, where, the unique identifier consists of a file name and at least one of the following: a version number; an error check value.

7. An electronic transaction system according to claim 1, where, the content management system operates to provide the content to each transaction device of the at least one transaction device.

8. An electronic transaction system according to claim 1, where the content includes, in respect of each electronic service and/or good able to be transacted; at least one of the following:
   a description;
   a graphic to represent the electronic service or good; details of acceptable payment methods;
   details of acceptable validation or data entry mechanisms; and/or
   details of any document to be provided when the service response confirms a service request was successful.

9. An electronic transaction system according to claim 1, where the content includes at least one of the following:
   a menu structure for navigating the electronic services and goods able to be transacted; and
   details of any security mechanisms implemented to control access to any restricted portions of the menu structure.

10. An electronic transaction system according to claim 1, where the host server operates to generate a client response in reply to the client request by reference to a process model, the process model conceptually comprising a series of steps and links, the arrangement of one or more links in respect of a first step representing a second step to process on the first step resolving to a predetermined result in a set of predetermined results.

11. An electronic transaction system according to claim 10, where the set of predetermined results are a set of Boolean values and a fail result.

12. An electronic transaction system according to claim 1, comprising at least one channel grouping, each channel grouping associated with at least one transaction device, where content provided to each transaction device of a channel grouping is the same as content provided to each other transaction device in the same channel grouping.

13. An electronic transaction system according to claim 1, comprising at least one relationship, each relationship recording details for facilitating communication between the host server and either a transaction device or a service provider system, using their respective native languages and communication protocols.

14. An electronic transaction system according to claim 1, wherein the electronic inventory is operable to provide an electronic good to the host server on request.

15. An electronic transaction system according to claim 14, where a request from the host server for an electronic good includes a goods identifier, the electronic inventory operable to provide an electronic good having a corresponding goods identifier in response to the request.

16. An electronic transaction system according to claim 14, where, on return of an electronic good to the electronic inventory, the electronic good is not able to be provided in response to a request from the host server for a predetermined period of time.

17. An electronic transaction system according to claim 14, where the electronic good is a serial number to be provided in redeeming an electronic service able to be transacted.

18. An electronic transaction system according to claim 1, where the host server is operable to distinguish between the service response and the client request by reference to the correlation key and/or type.

19. An electronic transaction system according to claim 1, where each service request, service response, client request and client response is communicated via at least one message bus.

20. An electronic transaction system according to claim 19, where at least one message bus uses a publish/subscribe mechanism of communication.

21. An electronic transaction system according to claim 1, where the transaction device includes at least one payment application.

22. An electronic transaction system according to claim 21, further comprising an intermediate router having a dedicated connection to the host server and to a payments host, the intermediate router operable to forward a service request issued by a transaction device to the host server and operable to forward a payment request issued by the payment application of the transaction device to the payments host.

23. An electronic transaction system according to claim 22, where the transaction device issues an authorisation request to the intermediate router for forwarding to the payments host and receives an authorisation reply from the payments host via the intermediate router and where, if so authorised, the transaction system thereafter issues a service request to the transaction to the host server via the intermediate router and, upon receiving a service response indicating that the service request was successful, issuing a payment request to the payments host via the intermediate router.

24. An electronic transaction system according to claim 21, where the transaction device includes removable, writeable media for recording one or more of the following: a receipt; an electronic good; details of the client request; details of the client response.

25. An electronic transaction system according to claim 1, where the host server operates to confirm the identity and/or capacity of the transaction device that issued the client request and, if the identity of the transaction device can not be confirmed, or the capacity of the transaction device is exceeded, operable to ignore the client request.

26. A transaction device for use in an electronic transaction system according to claim 1.

27. A method of performing an electronic transaction comprising the steps of:
   storing by a host server an electronic inventory of electronic goods and/or services;

receiving, by the host server, a client request from a transaction device generating, by the host server, a response to the client request;

issuing, by the host server, a service request to an at least one service provider system;

receiving a service response, by the host server, from the at least one service provider and issuing, by the host server, content to the transaction device based on the service response;

receiving, by the transaction device, a scheduled time for transmission of the content from the content management system;

requesting, by the transaction device, a set of unique identifiers from the host server on the scheduled time for transmission;

receiving, by the transaction device, the set of unique identifiers from the host server each unique identifier representing a component of the content checking, by the transaction device, the set of unique identifiers against content already provided by the content management system;

requesting, by the transaction device, from the content management system, content having unique identifiers not already provided from the content management system; and transmitting, by the content management system, content to the transaction device based on the request.

28. A method of performing an electronic transaction according to claim 27, including the step of referencing a matrix recording a set of permissions and/or constraints to ensure that the content to be provided to each transaction device complies with the recorded set of permissions and/or constraints.

29. A method of performing an electronic transaction according to claim 28, including the steps of determining whether the client request complies with the set of permissions and/or constraints recorded in the matrix and the step of generating a client response includes the sub-step of referencing the matrix to ensure that the set of permissions and/or constraints are complied with.

30. A method of performing an electronic transaction according to claim 27, where the step of generating a client response includes the substep of executing a process model, the process model conceptually comprising a series of steps and links, the arrangement of one or more links in respect of a first step representing a second step to process on the first step resolving to a predetermined result in a set of predetermined results.

31. A method of performing an electronic transaction according to claim 27, including the step of associating each transaction device with at least one channel grouping, the content provided to each transaction device of a channel grouping being the same as content provided to every other transaction device in the same channel grouping.

32. A method of performing an electronic transaction according to claim 27, including the step of recording details for facilitating communication between the host server and each transaction device and the host server and each service provider system to form a set of relationships and the step of using the appropriate relationship in the set of relationships to facilitate communication between the host server and transaction device or service provider system, as appropriate, in their respective native languages and communication protocols.

33. A method of performing an electronic transaction according to claim 27, including the steps of issuing a request to an electronic inventory for an electronic good and receiving an electronic good from the electronic inventory.

34. A method of performing an electronic transaction according to claim 27, including the step of distinguishing between a service response and a client request by reference to a correlation key in the service response and/or type.

35. A method of performing an electronic transaction according to claim 27, including the step of communicating service requests, service responses, client requests and client responses by way of at least one message bus using a publish/subscribe mechanism of communication.

36. A method of performing an electronic transaction according to claim 27, including the steps of confirming the identity and/or capacity of the transaction device that issued the client request and the step of ignoring the client request if the identity of the transaction device can not be confirmed or the capacity of the transaction device is exceeded.

* * * * *